G. E. Newell,
Dumping Cart.
N° 73,918. Patented Jan. 28, 1868.
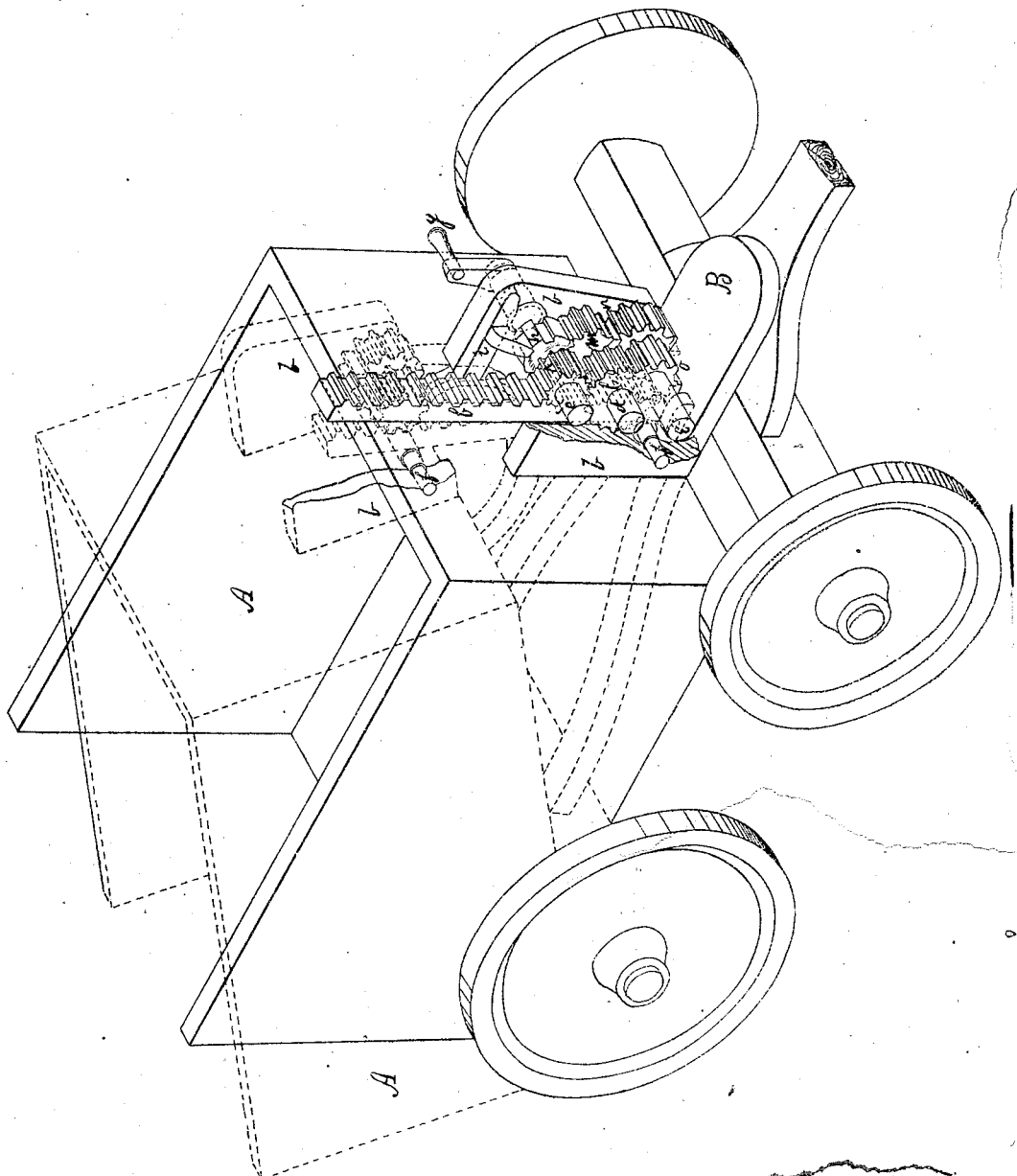
Witnesses.
J. M. Cosgrove
C. L. Pendleton
Inventor.
George E. Newell

United States Patent Office.

GEORGE E. NEWELL, OF PAWTUCKET, RHODE ISLAND.

Letters Patent No. 73,918, dated January 28, 1868.

IMPROVEMENT IN DUMPING-CARTS.

The Schedule referred to in these Letters Patent and making part of the same.

TO ALL WHOM IT MAY CONCERN:

Be it known that I, GEORGE E. NEWELL, of Pawtucket, in the county of Providence, and State of Rhode Island, have invented a new and useful Improvement in Dumping-Carts; and I do hereby declare that the following specification, taken in connection with the drawings making a part of the same, is a full, clear, and exact description thereof.

The drawing exhibits in perspective a cart with my improvement attached, the body of the cart being also traced in red outline, to show its position when dumping its load.

The object of my improvement is to provide a convenient means for raising the forward end of a cart-body, for the purpose of enabling it to discharge its load.

In the drawings, A represents the body of an ordinary four-wheeled cart similar to the carts commonly used in cities for carrying coals. Upon the fork of the tongue, or other convenient place in front of the cart, I mount a platform, B, which gives support to the foot of a toothed rack, C, which rack rises to the height that is necessary to tilt the body of the cart to change the centre of gravity of the load sufficiently to enable it to be discharged. This rack is pivoted to the lower end of the platform, so as to admit of a movement by which it shall in all positions of the cart-body always remain in gear with the pinion which engages with it. Attached to the body of the cart are the two side pieces $b\ b$, which serve as bearings for the axles $c\ d\ e$, and of the friction-roll $f$. The axle $c$ is furnished with a crank, $g$, and it carries also the notched wheel $h$, with the teeth of which a stop-dog, $i$, can at pleasure be made to engage. Upon the end of the axle $c$, opposite to the end that carries the crank, is affixed the toothed wheel $k$. The axle $d$ is provided with the two gear-wheels $l$ and $m$, one of which, $l$, is moved by the gear $k$ upon the crank-axle, and receives from it its motion. The other gear, $m$, upon this axle $d$, works into and imparts motion to another gear, $n$, fastened to a third axle, E. Upon this latter axle is fastened the pinion $o$, whose teeth act upon those of the toothed rack C, heretofore mentioned. Bearing against the side of the rack C, opposite to that on which lies the pinion $o$, is placed the friction-roller $f$, which has its bearings in the side pieces $b\ b$, which support the axle of the pinion $o$, and serves in all positions of the cart-body to keep the teeth of the rack properly engaged with those of the pinion. It is quite evident that if the crank is operated to turn the axle $c$, such motion will be imparted to the pinion $o$ upon the axle E, by means of the gears $k\ l\ m\ n$, placed as described, and the cart-body can be readily tilted. By means of the dog $i$ and notched wheel $h$, the position of the cart-body can be maintained at any desired point, or when down can be kept from tilting, while the power necessary to be applied to raise the forward end of the cart-body can be varied in any required degree by changing the relative diameters of the gears $k\ l\ m\ n\ o$.

I do not claim broadly the use of a rack and pinion, in combination with a cart-body, for the purpose of more conveniently elevating the forward end of such cart-body, as I am aware that similar devices for such purpose have heretofore been employed; but What I do claim as my invention, and desire to secure by Letters Patent, is—

1. The combination and arrangement of the hinged rack C, the train of gear-wheels $k\ l\ m\ n\ o$, and the pressure-roller $f$, with the body of a dumping-cart, substantially as described, for the purposes specified.

2. Combining with the hinged rack C a pressure-roller, $f$, for the purpose of keeping the teeth of the rack in engagement with the teeth of its operating pinion at all positions of the cart-body, substantially as described.

GEORGE E. NEWELL.

Witnesses:
C. L. PENDLETON,
I. M. COSGROVE.